United States Patent
Fischer et al.

(10) Patent No.: US 10,104,129 B1
(45) Date of Patent: Oct. 16, 2018

(54) CONFIDENTIALITY-BASED FILE HOSTING

(71) Applicant: Prysm, Inc., San Jose, CA (US)

(72) Inventors: Brandon Fischer, Carmel, IN (US); Adam P. Cuzzort, Westfield, IN (US)

(73) Assignee: Prysm, INC., San Jose, CA (US)

( * ) Notice: Subject to any disclaimer, the term of this patent is extended or adjusted under 35 U.S.C. 154(b) by 153 days.

(21) Appl. No.: 15/183,539

(22) Filed: Jun. 15, 2016

(51) Int. Cl.
| | |
|---|---|
| *H04L 29/06* | (2006.01) |
| *G06F 17/00* | (2006.01) |
| *G06F 7/04* | (2006.01) |
| *G06F 17/30* | (2006.01) |
| *H04N 7/16* | (2011.01) |

(52) U.S. Cl.
CPC .......... *H04L 63/205* (2013.01); *H04L 63/105* (2013.01)

(58) Field of Classification Search
None
See application file for complete search history.

(56) References Cited

U.S. PATENT DOCUMENTS

| | | |
|---|---|---|
| 6,937,730 B1 | 8/2005 | Buxton |
| 2006/0248599 A1* | 11/2006 | Sack ................... G06F 21/6227 726/27 |
| 2007/0043673 A1 | 2/2007 | Hirano |
| 2007/0300306 A1 | 12/2007 | Hussain |
| 2009/0089379 A1 | 4/2009 | Pegg |
| 2012/0291133 A1* | 11/2012 | Nagpal ................ G06F 21/6218 726/26 |
| 2014/0033067 A1 | 1/2014 | Pittenger et al. |
| 2014/0033265 A1 | 1/2014 | Leeds et al. |
| 2017/0160951 A1* | 6/2017 | Borlick ................. G06F 3/0685 |
| 2017/0339216 A1 | 11/2017 | Carlos et al. |
| 2017/0353445 A1* | 12/2017 | Steeves ............... H04L 63/0823 |

OTHER PUBLICATIONS

"Non-Final Office Action", U.S. Appl. No. 15/159,594, dated Dec. 29, 2017, 9 pages.
"Final Office Action", U.S. Appl. No. 15/159,594, dated Aug. 27, 2018, 9 pages.

* cited by examiner

*Primary Examiner* — Eric Chen
(74) *Attorney, Agent, or Firm* — Wolfe-SBMC

(57) ABSTRACT

Various embodiments provide confidentiality-based file hosting by automatically directing assets in a shared workspace to appropriate storage locations. The storage location can be determined by comparing a security level that is associated with an asset to security levels of multiple possible storage locations. If a security level of the asset is changed in the shared workspace, the asset is automatically directed to an appropriate storage location based on the changed security level. This can include directing the asset to either a more secure or a less secure storage location.

20 Claims, 10 Drawing Sheets

CONFIDENTIALITY-BASED FILE HOSTING

BACKGROUND

Currently, digital content may be shared between different computer devices implementing various techniques. During a content sharing session, a shared workspace that includes various types of digital content may be displayed on multiple computer devices at different physical locations, or a shared workspace displayed on one computer device may be shared with different remote computer devices. Assets that make up the digital content of a shared workspace may require varying degrees of security protection. How and where to store these assets continues to challenge those who design collaboration systems.

Presently, selecting storage locations to store assets is typically entirely determined by a user. This can be challenging for users, particularly when they are unaware of protection schemes and the sensitivity of various assets.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
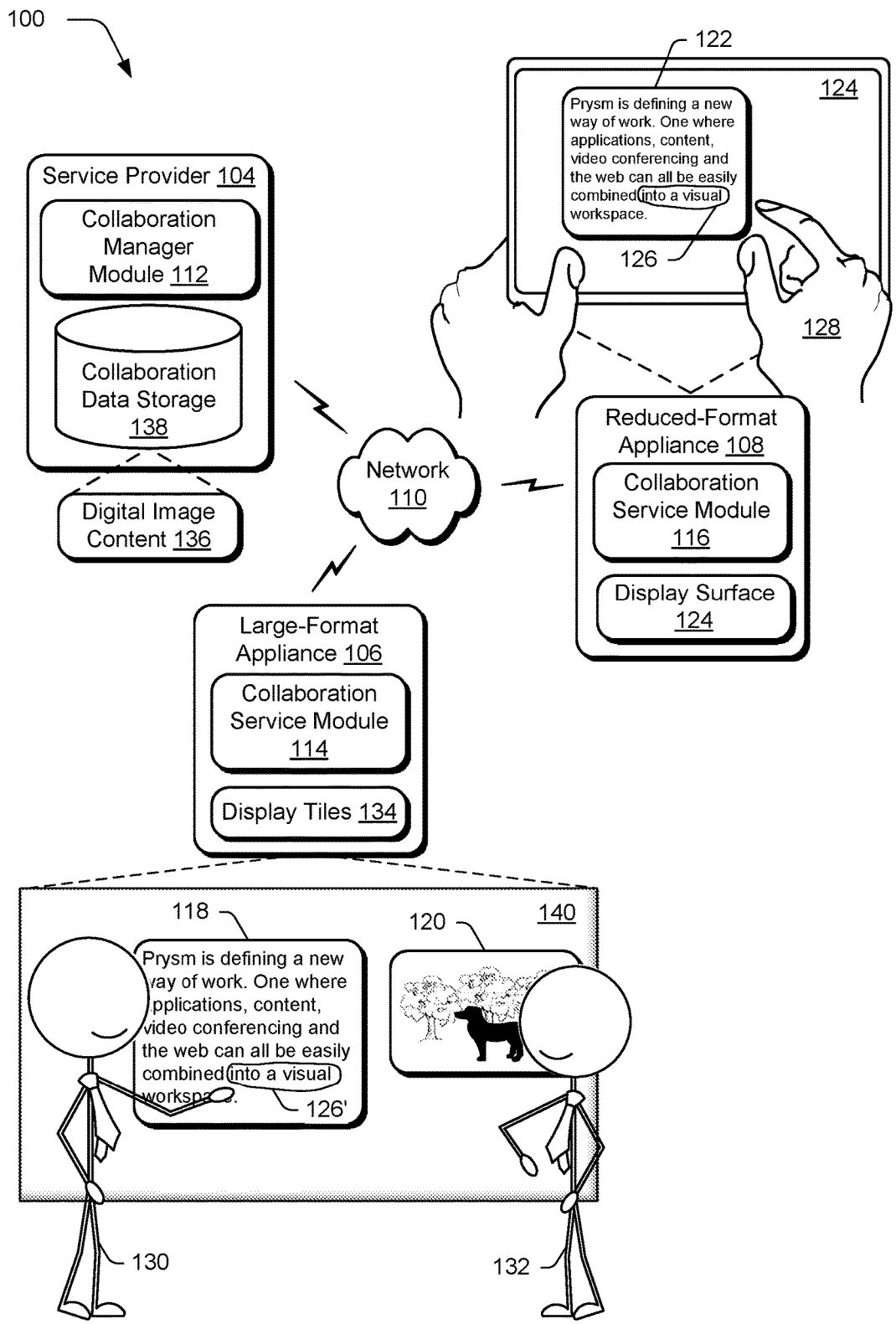
FIG. 1 is an illustration of a collaboration system operable to employ techniques described herein.

Various embodiments enable confidentiality-based file hosting by automatically and dynamically directing assets to appropriate storage locations. Asset directing is based on security levels associated with the assets and security levels associated with various possible storage locations. In one implementation, the described techniques involve an appliance participating in a shared workspace with at least one other appliance. The shared workspace enables the appliances to create, present, and/or edit assets between the appliances. An asset may have an associated security level that indicates a minimum level of security for storage, transmission, or presentation of the asset.

During a collaboration using the shared workspace, an asset can be shared between two or more appliances. Sharing the asset may involve presenting the asset to viewers at the location of the other appliance, collaboratively editing the asset between the appliances, sending the asset from one appliance to another appliance, or creating the asset from scratch using functionality of the appliances. Additional examples of sharing the asset are provided below. When the asset is shared, a security level associated with the asset may change. For example, adding content to the asset may cause the asset to acquire a higher level of security which, in turn, can affect storage or transmission or the asset.

When the asset is shared between appliances, it can be difficult for participants to quickly and accurately determine an appropriate location to direct the asset for storage due, in part, to not being knowledgeable of the security level of the asset and the security levels of the various available storage options. Taking time to make this determination during the collaboration using the shared workspace takes away from valuable time of the participants using the shared workspace. However, failing to update the storage location of an asset in a timely manner can have its own problems. For example, participants can forget to change the storage location to reflect a new level of security when the asset is shared or changed, causing unintended access to the asset by users without a required security clearance. Therefore, it would be beneficial to have automatic direction of asset storage based on circumstances associated with a shared workspace.

Techniques described herein provide direction of assets having a designated security level to a storage location having a security level commensurate with or more secure than the security level associated with the asset. In one or more implementations, a server storage location can be selected from a number of different storage locations including a location within a network security system (termed an "on-premises server"), or a location at an internet-accessible server. Because on-premises servers that are within network security systems can be more secure than internet accessible servers, this can be a deciding factor in which location to select to store an asset. Additionally, if a security level of the asset is changed during a collaboration, the asset can be automatically directed to an appropriate storage location based on the changed security level. This can include directing the asset to either a more secure or a less secure storage location, such as between a more secure on-premises server, or a less secure internet accessible server. Further, because storage location security levels are known, no further input is needed from the participants in the collaboration regarding where to direct the asset. That is, in various embodiments, the asset can be automatically directed to a storage location having an appropriate level of security, so that participants can focus on the substance of the collaboration rather than worrying about adequate and secure asset storage.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment FIG. 1 is an illustration of a collaboration system 100 in an example implementation that is configured to implement one or more aspects of the techniques described herein. As shown, collaboration system 100 includes, without limitation, a service provider 104 and appliances that are used to implement a shared workspace, illustrated examples of which include a large-format appliance 106 and a reduced-format appliance 108, each of which are communicatively coupled via a network 110. The large-format appliance 106 is one that has a physically self-supporting display (e.g., greater than 35 inches diagonal) with rich hardware resources including processing, memory, or network resources, which may support simultaneous interaction with a plurality of users as illustrated. The reduced-format appliance 108, on the other hand, has a housing configured to be held by one or more hands of a user or placed on a surface (e.g., as a display device of a personal computer) and may have reduced processing, memory, and network resources in comparison to the large-format appliance 106, which support single user interaction due to this size. Although large and reduced format appliances 106, 108 are described in relation to the following examples, it should be readily apparent that a plurality of appliances may be made up of appliances that support large or reduced formats, solely.

The service provider 104 is illustrated as including a collaboration manager module 112 and the appliances are illustrated as including respective collaboration service modules 114, 116 that together are representative of functionality implemented at least partially in hardware to support a shared workspace of a collaborative environment as further described in the following. Collaboration service modules 114, 116, for instance, may be configured as software such as applications, third-party plug-in modules, webpages, web applications, web platforms, and so on that support participation as part of a shared workspace. The collaboration manager module 112 is representative of functionality (e.g., implemented via software) that is usable to manage this interaction, examples of which are further described in relation to FIGS. 2-4. Although illustrated separately, functionality of the collaboration manager module 112 to manage the shared workspace may also be incorporated by the appliances themselves.

The collaboration service modules 114, 116, for instance, may be implemented as part of a web platform that works in connection with network content, e.g. public content available via the "web," to implement a shared workspace. A web platform can include and make use of many different types of technologies such as, by way of example and not limitation, URLs, HTTP, REST, HTML, CSS, JavaScript, DOM, and the like. The web platform can also work with a variety of data formats such as XML, JSON, and the like. Web platform can include various web browsers, web applications (i.e. "web apps"), and the like. When executed, the web platform allows a respective appliance to retrieve assets (e.g., web content) such as electronic documents in the form of webpages (or other forms of electronic documents, such as a document file, XML file, PDF file, XLS file, etc.) from a Web server (e.g., the service provider) for display on a display device in conjunction with the shared workspace.

The shared workspace is configured to share asset and user interactions with those assets. In the context of this disclosure, an "asset" may refer to any interactive renderable content that can be displayed on a display, such as on a display device of the large-format appliance 106 or reduced-format appliance 108, among others. Interactive renderable content is generally derived from one or more persistent or non-persistent content streams that include sequential frames of video data, corresponding audio data, metadata, flowable/reflowable unstructured content, and potentially other types of data.

Generally, an asset may be displayed within a dynamically adjustable presentation window. An example of this is illustrated presentation windows 118, 120 for the large-format appliance 106 and presentation window 122 as displayed for the reduced-format appliance 108. For simplicity, an asset and corresponding dynamically adjustable presentation window are generally referred to herein as a single entity, i.e., an "asset." Assets may comprise content sources that are file-based, web-based, or Live Source. Assets may include images, videos, webpages (e.g., viewable within a browser, web-enabled application, web platform), documents, renderings of laptop screens, presentation slides, any other graphical user interface (GUI) of a software application, and the like.

An asset generally includes at least one display output generated by a software application, such as a GUI of the software application. In one example, the display output is a portion of a content stream. In addition, an asset is generally configured to receive one or more software application inputs. The reduced-format appliance 108, for instance, may include a display surface 124 (e.g., implemented by one or more display devices) having gesture detection functionality (e.g., a touch sensitive display device, a display device associated with one or more cameras configured to capture a natural user input, and so forth) to capture a gesture, such as an annotation 126 to circle text in a document made by one or more fingers of a user's hand 128. The annotation is then communicated and displayed on the large-format applicant 106 as annotation 126' that also circles corresponding text in a presentation window 118 that is viewable by users 130, 132 of that appliance. Thus, unlike a fixed image, an asset is a dynamic element that enables interaction with the software application associated with the asset, for example, for manipulation of the asset. For example, an asset may include select buttons, pull-down menus, control sliders, and so forth that are associated with the software application and can provide inputs to the software application.

As also referred to herein, a "shared workspace" is a virtual container of assets along with a virtual digital canvas on which the container's assets associated workspace may be representatively laid out in a manner that when rendered to one or more sized screens there with, the system displays the assets in a manner as represented by the virtual canvas and their corresponding content streams, are displayed within a suitable dynamic "viewport window". Thus, a shared workspace may comprise one or more associated assets (each asset displayed within a presentation window), whereby the entire shared workspace is displayed within a dynamically adjustable viewport window. A shared workspace may be displayed in the entire potential render area/space of a display device of the large-format appliance 106 and/or the reduced-format appliance 108, so that only a single shared workspace can be displayed on the surface thereof. In this case, the area of the viewport window that displays the shared workspace comprises the entire render area of the large-format appliance 106 and/or the reduced-format appliance 108. In other implementations, however, the shared workspace and the viewport window may be displayed in a sub-area of the total display area of the large-format appliance 106 and/or the reduced-format appliance 108 that does not comprise the entire render area of respective display devices of these appliances. For example, multiple shared workspaces may be displayed in multiple viewport windows on the large-format appliance 106 and/or the reduced-format appliance 108 concurrently, whereby each shared workspace and viewport window does not correspond to the entire display surface. Each asset associated with a shared workspace, and content stream(s) corresponding to the asset, are displayed in a presentation window according to defined dimensions (height and width) and a location within the shared workspace and viewport window. The asset and presentation window dimensions and location may also be user-adjustable. As also referred to herein, a "project" may comprise a set of one or more related shared workspaces.

The large-format appliance 106 in this example is formed using a plurality of display tiles 134, e.g., arranged to form a display wall. The service provider 104 includes digital image content 136, which is illustrated as stored in collaboration data storage 136, e.g., using one or more memory devices as further described in relation to FIG. 10. The service provider 104 may receive this digital image content 136 from a variety of sources, such as the reduced-format appliance 108, the large-format appliance 106, remotely via a third-party source via the network 110 (e.g., a website), or from an information network or other data routing device, and converts the input into image data signals. Thus, digital image content 136 may be generated locally, with the large-format appliance 106 or the reduced-format appliance 108, or from some other location. For example, when the collaboration system 100 is used for remote conferencing, digital image content 136 may be received via any technically feasible communications or information network, wired or wireless, that allows data exchange, such as a wide area network (WAN), a local area network (LAN), a wireless (Wi-Fi) network, and/or the Internet, among others as represented by network 110. The service provider 104, reduced-format appliance 108, and large-format appliance 106 may be implemented as one or more computing devices, such as part of dedicated computers, as one or more servers of a server farm (e.g., for the service provider 104 as implementing one or more web services), dedicated integrated circuit, and so on. These computing devices are configured to maintain instructions in computer-readable media and that are executable by a processing system to perform one or more operations as further described in relation to FIG. 10.

Display devices of the large-format appliance 106 and/or the reduced-format appliance 108 may include the display surface or surfaces of any technically feasible display device or system type, including but not limited to the display surface of a light-emitting diode (LED) display, a digital light (DLP) or other projection displays, a liquid crystal display (LCD), optical light emitting diode display (OLED), laser-phosphor display (LPD) and/or a stereo 3D display all arranged as a single stand-alone display, head mounted display or as a single or multi-screen tiled array of displays. Display sizes may range from smaller handheld or head mounted display devices to full wall displays. In the example illustrated in FIG. 1, the large-format appliance 106 includes a plurality of display light engine and screen tiles mounted in an array, which are represented by the display tiles 134.

In operation, the large-format appliance 106 displays image data signals received from the service provider 104. For a tiled display, image data signals are appropriately distributed among display tiles 134 such that a coherent image is displayed on a display surface 140 of the large-format appliance 106. Display surface 140 typically includes the combined display surfaces of display tiles 134. In addition, the display surface 140 of large-format appliance 106 is touch-sensitive that extends across part or all surface area of display tiles 134. In one implementation, the display surface 140 senses touch by detecting interference between a user and one or more beams of light, including, e.g., infrared laser beams. In other implementations, display surface 140 may rely on capacitive touch techniques, including surface capacitance, projected capacitance, or mutual capacitance, as well as optical techniques (e.g., sensor in a pixel), acoustic wave-based touch detection, resistive touch approaches, and so forth, without limitation and thus may detect "touch" inputs that do not involve actual physical contact, e.g., as part of a natural user interface. Touch sensitivity of the display surface 140 enables users to interact with assets displayed on the wall implementing touch gestures including tapping, dragging, swiping, and pinching. These touch gestures may replace or supplement the use of typical peripheral I/O devices, although the display surface 140 may receive inputs from such devices, as well. In this regard, the large-format appliance 106 may also include typical peripheral I/O devices (not shown), such as an external keyboard or mouse.

The display surface 140 may be a "multi-touch" surface, which can recognize more than one point of contact on the large-format appliance 106, enabling the recognition of complex gestures, such as two or three-finger swipes, pinch gestures, and rotation gestures as well as multiuser two, four, six etc. hands touch or gestures. Thus, a plurality of users 130, 132 may interact with assets on the display surface 140 implementing touch gestures such as dragging to reposition assets on the screen, tapping assets to display menu options, swiping to page through assets, or implementing pinch gestures to resize assets. Multiple users 130, 132 may also interact with assets on the screen simultaneously. Again, examples of assets include application environments, images, videos, webpages, documents, mirroring or renderings of laptop screens, presentation slides, content streams, and so forth. Touch signals are sent from the display surface 140 to the service provider 104 for processing and interpretation. It will be appreciated that the system shown herein is illustrative only and that variations and modifications are possible.

Figure 2:
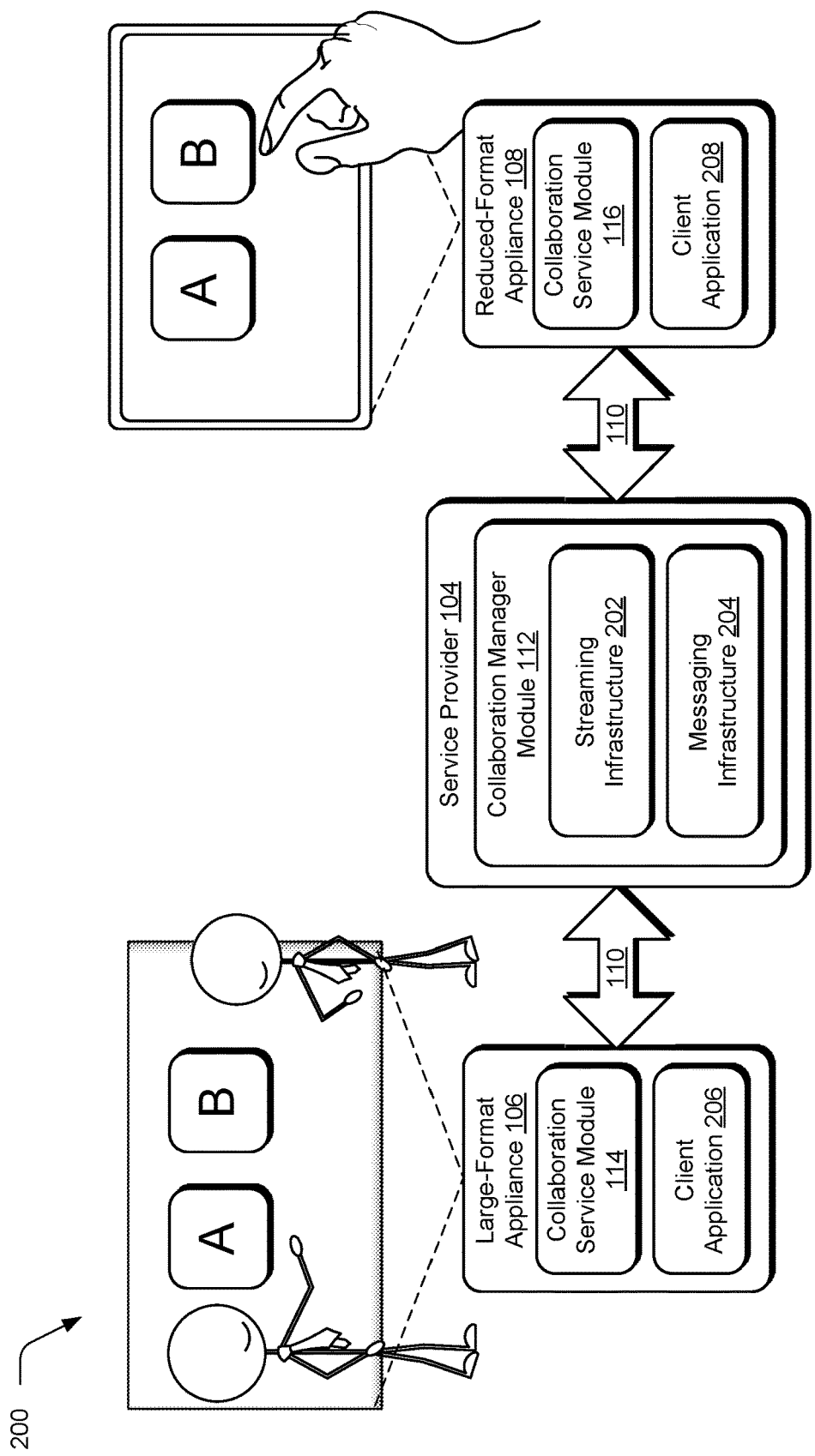
FIG. 2 is a conceptual diagram of a communication infrastructure of the collaboration system of FIG. 1 as sharing content streams across appliances.

FIG. 2 is a conceptual diagram of a communication infrastructure 200 of the collaboration system 100 of FIG. 1 as sharing content streams across appliances, e.g., across the large and reduced format appliances 106, 108 through interaction with the service provider 104. As shown, this communication infrastructure 200 includes, without limitation, the large-format appliance 106 and the reduced-format appliance 108 communicatively coupled to service provider 104 via a network 110. As shown in FIG. 2, communication infrastructure 200 of this example implementation includes streaming infrastructure 202 and messaging infrastructure 204 included as part of the collaboration manager module 112 to support communication of the collaboration service modules 114, 116 to implement the shared workspace.

Large-format appliance 106 is illustrated as sharing a content stream A, via communication infrastructure 200, with the reduced-format appliance 108. In response, reduced-format appliance 108 is configured to retrieve content stream A from communication infrastructure 200 and to display that content stream on a display device of the reduced-format appliance 108 with its content stream B. Likewise, reduced-format appliance 108 is configured to share content stream B, via communication infrastructure 200, with the large-format appliance 106. In response, the large-format appliance 106 is configured to retrieve content stream B from communication infrastructure 200 and to display that content stream on a display device of the large-format appliance 106 with its content stream A.

In this fashion, the large and reduced format appliances 106, 108 are configured to coordinate with one another via the service provider 104 to generate a shared workspace that includes content streams A and B. Content streams A and B may be used to generate different assets rendered within the shared workspace. In one embodiment, each of the large and reduced format appliances 106, 108 perform a similar process to reconstruct the shared workspace, thereby generating a local version of that shared workspace that is similar to other local versions of the shared workspace reconstructed at other appliances. As a general matter, the functionality of the large and reduced format appliances 106, 108 are coordinated by respective collaboration service modules 114, 116 and client applications 206, 208, respectively.

Client applications 206, 208 are software programs that generally reside within a memory (as further described in relation to FIG. 10) associated with the respective appliances. Client applications 206, 208 may be executed by a processing system included within the respective appliances. When executed, client applications 206, 208 set up and manage the shared workspace discussed above in conjunction with FIG. 2, which, again, includes content streams A and B. In one implementation, the shared workspace is defined by metadata that is accessible by both the large and reduced format appliances 106, 108. Each of the large and reduced format appliances 106, 108 may generate a local version of the shared workspace that is substantially synchronized with the other local version, based on that metadata (discussed below in relation to FIG. 3).

In doing so, client application 206 is configured to transmit content stream A to streaming infrastructure 200 for subsequent streaming to the reduced-format appliance 108. Client application 206 also transmits a message to the reduced-format appliance 108, via messaging infrastructure 204, indicating to the large-format appliance 106 that content stream A is available and can be accessed at a location reflected in the message. In like fashion, client application 208 is configured to transmit content stream B to streaming infrastructure 202 for subsequent streaming to the large-format appliance 106. Client application 208 also transmits a message to the large-format appliance 106, via messaging infrastructure 204, indicating to the large-format appliance 106 that content stream B is available and can be accessed at a location reflected in the message. The message indicates that access may occur from a location within streaming infrastructure 202.

Client application 206 may also broadcast a message via messaging infrastructure 204 to the reduced-format appliance 108 that specifies various attributes associated with content stream A that may be used to display content stream A. The attributes may include a location/position, a picture size, an aspect ratio, or a resolution with which to display content stream A on the reduced-format appliance 108, among others, and may be included within metadata described below in relation to FIG. 3. Client application 208 may extract the attributes from messaging infrastructure 204, and then display content stream A at a particular position on a display device of the reduced-format appliance 108, with a specific picture size, aspect ratio, and resolution, as provided by messaging infrastructure 204. Through this technique, the large-format appliance 106 is capable of sharing content stream A with the reduced-format appliance 108. The reduced-format appliance 108 is also configured to perform a complimentary technique in order to share content stream B with the large-format appliance 106.

Client applications 206, 208 are thus configured to perform similar techniques in order to share content streams A and B, respectively with one another. When client application 206 renders content stream A on a display device of the large-format appliance 106 and, also, streams content stream B from streaming infrastructure 202, the large-format appliance 106 thus constructs a version of a shared workspace that includes content stream A and B. Similarly, when client application 208 renders content stream B on a display device of the reduced-format appliance 108 and, also streams content stream A from streaming infrastructure 202, the large-format appliance 106 similarly constructs a version of that shared workspace that includes content streams A and B.

The appliances (e.g., the large and reduced format appliances 106, 108) discussed herein are generally coupled together via streaming infrastructure 202 and messaging infrastructure 204. Each of these different infrastructures may include hardware that is cloud-based and/or co-located on-premises with the various appliances, which are both represented by network 110. However, persons skilled in the art will recognize that a wide variety of different approaches may be implemented to stream content streams and transport messages/messages between display systems.

Figure 3:
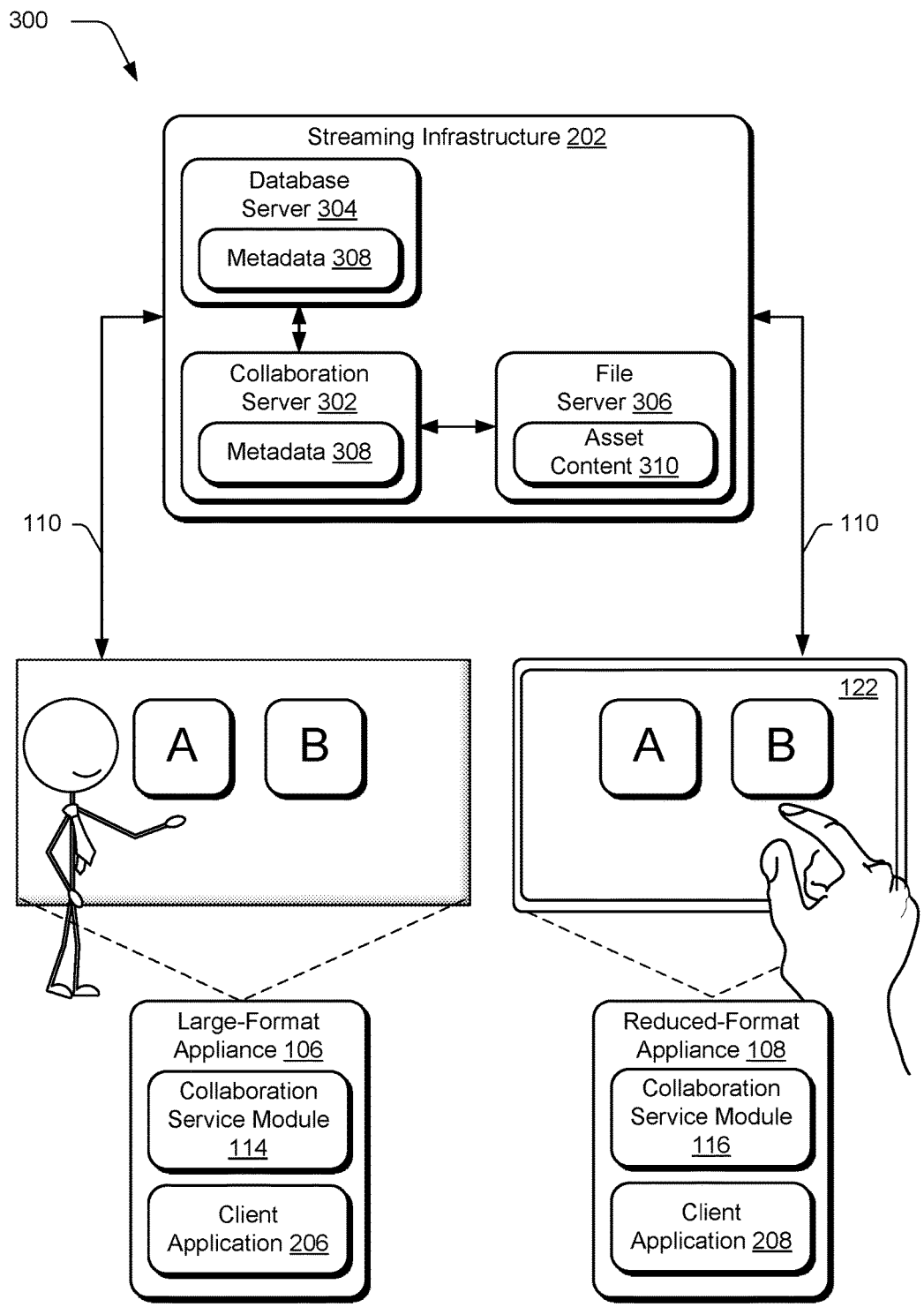
FIG. 3 depicts a streaming infrastructure of FIG. 2 in greater detail.

FIG. 3 depicts a block diagram 300 showing the streaming infrastructure 202 of FIG. 2 in greater detail. Streaming infrastructure 202 in this example includes a collaboration server 302, a database server 304, and a file server 306. Each server may comprise a computer device having a processor (such as processing system unit described in relation to FIG. 10) and a computer-readable medium such as memory, the processor executing software for performing functions and operations described herein. Collaboration server 302, database server 304, and file server 306 may be implemented as shown as separate and distinct computing devices/structures coupled to each other and to the appliances via a network 110. Alternatively, functionality of collaboration server 302, database server 304, and file server 306 may be implemented as a single computing device/structure in a single location, or in any other technically feasible combination of structures. Further, one or more of collaboration server 302, database server 304, and/or file server 306 may be implemented as a distributed computing system. The network 110 may be via any technically feasible communications or information network, wired or wireless, that allows data exchange, such as a wide area network (WAN), a local area network (LAN), a wireless (WiFi) network, and/or the Internet, among others.

Collaboration server 302 coordinates the flow of information between the various appliances (e.g., the large and reduced format appliances 106, 108), database server 304, and file server 306. Thus, in some implementations, collaboration server 302 is a streaming server for the appliances. In some embodiments, the application program interface (API) endpoint for the appliances and/or business logic associated with streaming infrastructure 202 resides in collaboration server 302. In addition, collaboration server 302 receives requests from appliances and can send notifications to the appliances. Therefore, there is generally a two-way connection between collaboration server 302 and each of appliances, e.g., the large and reduced format appliances 106, 108. Alternatively or additionally, appliances may make requests on collaboration server 302 through the API. For example, during collaborative work on a particular project via collaboration system 100, an appliance may send a request to collaboration server 302 for information associated with an asset to display the asset in a shared workspace of the particular project.

Database server 304 (as well as collaboration server 302) may store metadata 308 associated with collaboration system 200, such as metadata for specific assets, shared workspaces, and/or projects. For example, such metadata may include which assets are associated with a particular shared workspace, which shared workspaces are associated with a particular project, the state of various settings for each shared workspace, annotations made to specific assets, etc. Metadata 308 may also include aspect ratio metadata and asset metadata for each asset. In some implementations, aspect ratio metadata may include an aspect ratio assigned to the project (referred to herein as the "assigned aspect ratio"). An aspect ratio assigned to a project applies to the shared workspaces of the project so that all shared workspaces of the project have the same aspect ratio assigned to the project. Asset metadata for an asset may specify a location/position and dimensions/size of the asset within an associated shared workspace. In addition, metadata 308 may include security information which may be used to direct an asset to a particular storage location.

The asset metadata indicates the position and size of an asset, for example, implementing horizontal and vertical (x and y) coordinate values. In some embodiments, the asset metadata may express the position and size of an asset in percentage values. In such implementations, the size (width and height) and position (x, y) of the asset is represented in terms of percent locations along an x-axis (horizontal axis) and y-axis (vertical axis) of the associated shared workspace. For example, the position and size of an asset may be expressed as percentages of the shared workspace width and shared workspace height. The horizontal and vertical (x and y) coordinate values may correspond to a predetermined point on the asset, such as the position of the upper left corner of the asset. Thus, when display surfaces of appliances have different sizes and/or aspect ratios, each asset can still be positioned and sized proportional to the specific shared workspace in which is it being displayed. When multiple display devices of multiple appliances separately display a shared workspace, each may configure the local version of the shared workspace based on the received metadata.

File server 306 is the physical storage location for some or all asset content 310 that are rendered as files, such as documents, images, and videos. In some embodiments, file server 306 can receive requests for asset content 310 directly from appliances. For example, an asset, such as a word-processing document, may be associated with a shared workspace that is displayed on a display device of a plurality of appliances, e.g., the large and reduced format appliances 106, 108. When the asset is modified by a user at the large-format appliance 106, metadata for a file associated with the asset is updated in file server 306 by collaboration server 302, the reduced-format appliance 108 downloads the updated metadata for the file from file server 306, and the asset is then displayed, as updated, on the display surface 124 of the reduced-format appliance 108. Thus, file copies of all assets for a particular shared workspace and project may be stored at the file server 306, as well as stored at each appliance that is collaborating on a project.

Each of the appliances is an instance of a collaborative multi-media platform disposed at a different location in a collaboration system 100. Each collaboration appliance is configured to provide a digital system that can be mirrored at one or more additional and remotely located appliances. Thus, collaboration clients facilitate the collaborative modification of assets, shared workspaces, and/or complete presentations or other projects, as well as the presentation thereof.

Figure 4:
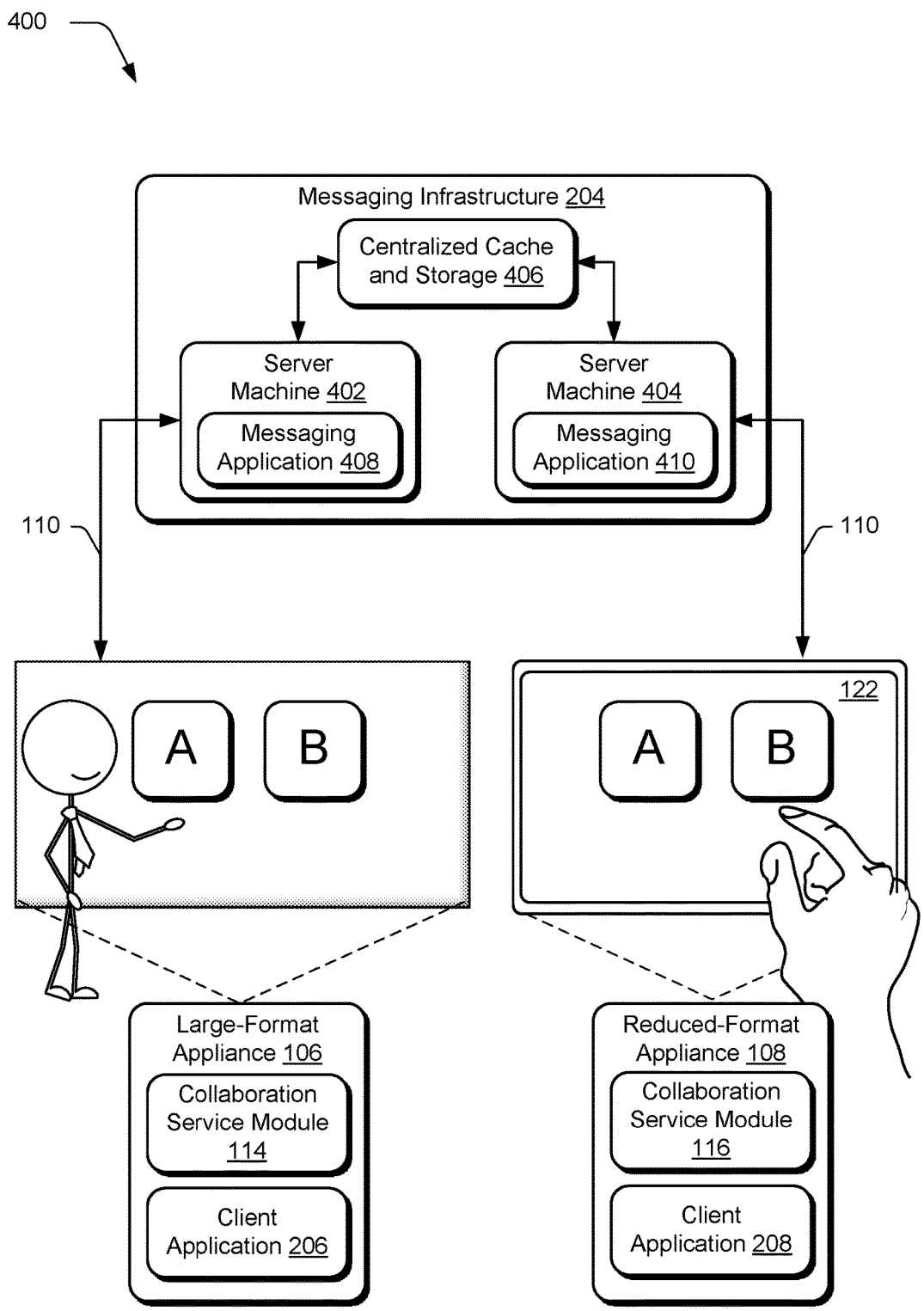
FIG. 4 depicts a messaging infrastructure of FIG. 2 in greater detail.

FIG. 4 depicts the messaging infrastructure 204 of FIG. 2 in greater detail. As shown, messaging infrastructure 204 includes server machines 402 and 404 coupled together via centralized cache and storage 406. Server machine 402 is coupled to the large-format appliance 106 and includes a messaging application 408. Server machine 404 is coupled to the reduced-format appliance 108 and includes a messaging application 410.

Figure 10:
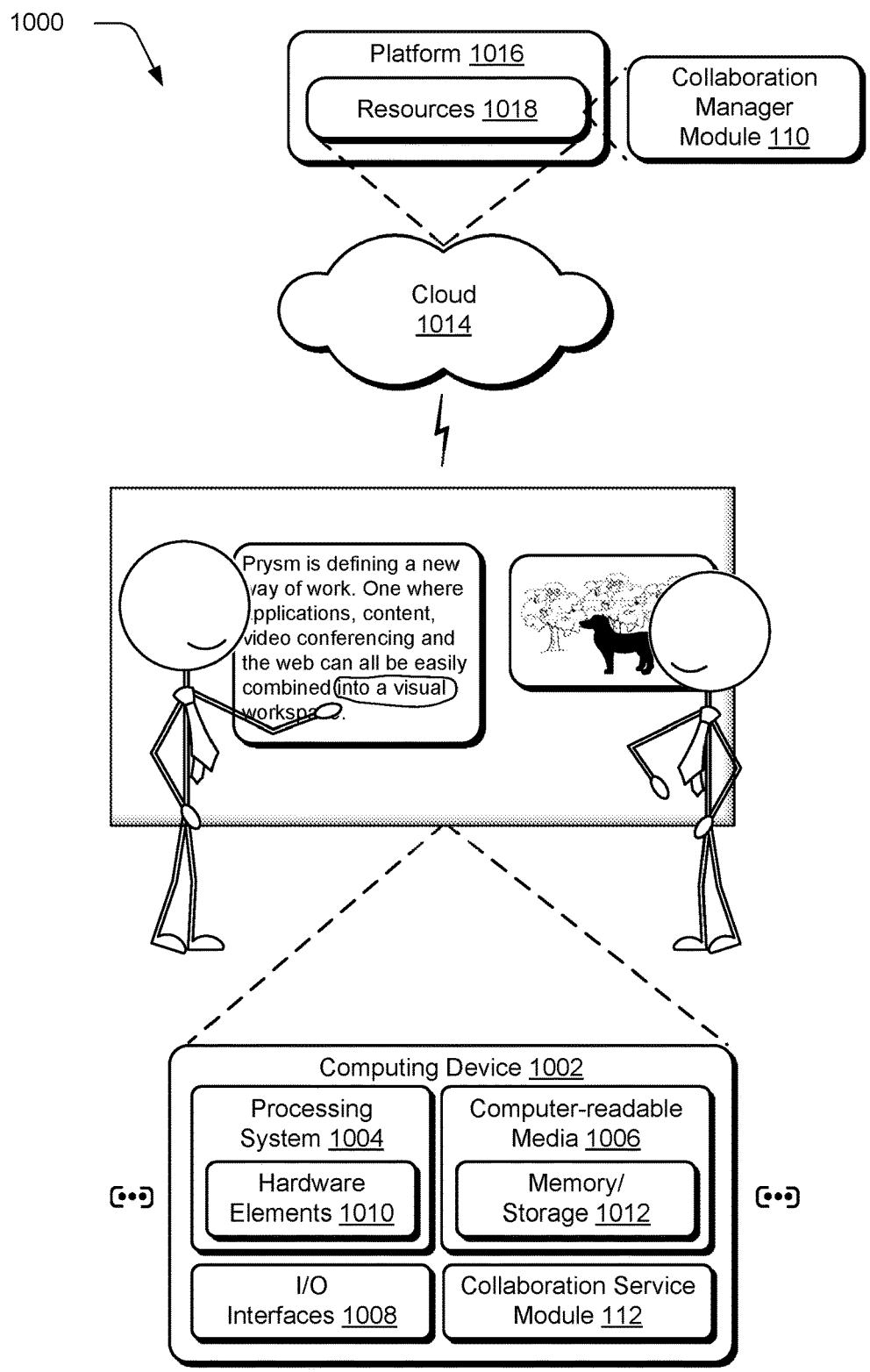
FIG. 10 illustrates an example system including various components of an example device that can be implemented as any type of computing device as described and/or utilize with reference to FIGS. 1-9 to implement embodiments of the techniques described herein.

Server machines 402 and 404 are generally cloud-based or on-premises computing devices that include memory and processing systems as further described in relation to FIG. 10 configured to store and execute messaging applications 408 and 410, respectively. Messaging applications 408 and 410 are configured to generate real-time socket connections with the large and reduced format appliances 106, 108, respectively, to allow messages to be transported quickly between the appliances. In one implementation, messaging applications 408 and 410 are implemented as ASP.NET applications and rely on signalR WebSockets to accomplish fast, real-time messaging.

Centralized cache and storage 406 provides a persistent messaging back-end through which messages can be exchanged between messaging applications 408 and 410. In one embodiment, centralized cache and storage includes a Redis cache backed by a SQL database. Messaging applications 408 and 410 may be configured to periodically poll centralized cache and storage 406 for new messages, thereby allowing messages to be delivered to those applications quickly.

In operation, when the large-format appliance 106 transmits a message indicating that content stream A is available on streaming infrastructure 202, as described above, the large-format appliance 106 transmits that message to messaging application 408. Messaging application 408 may then relay the message to centralized cache and storage 406. Messaging application 410 polls centralized cache and storage 406 periodically, and may thus determine that the message has arrived. Messaging application 410 then relays the message to the reduced-format appliance 108. The reduced-format appliance 108 may then parse the message to retrieve an identifier associated with the large-format appliance 106, and then stream content associated with the large-format appliance 106 from streaming infrastructure 202.

Having considered the above described shared workspace and supporting infrastructure, consider now example details and techniques associated with one or more implementations of confidentiality-based file hosting.

Confidentiality-Based File Hosting

Figure 5:
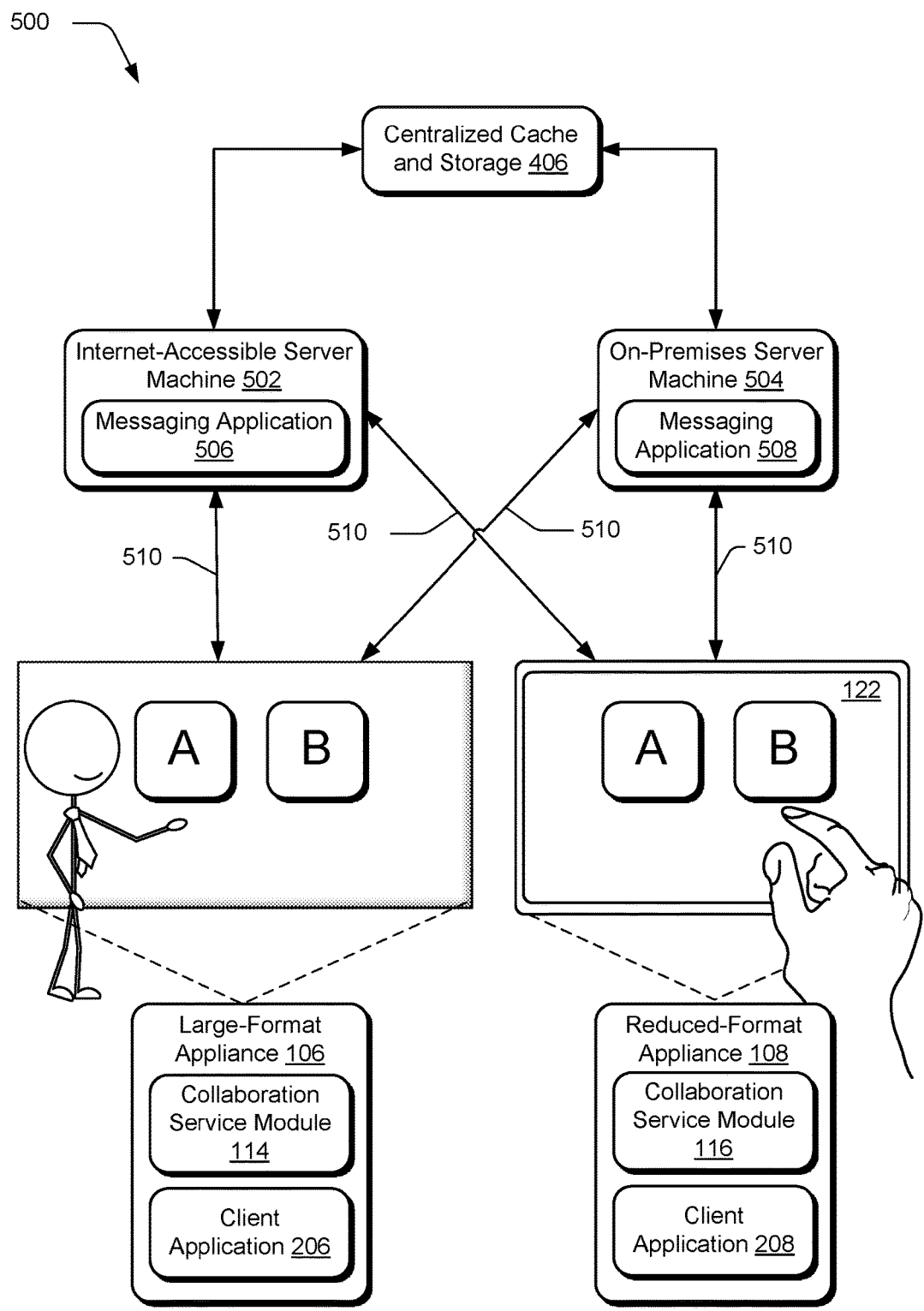
FIG. 5 illustrates a confidentiality-based file hosting system in accordance with one or more embodiments.

FIG. 5 illustrates a confidentiality-based file hosting system in accordance with one or more embodiments. As shown, the system includes an internet-accessible server machine 502 and an on-premises server machine 504 coupled together via centralized cache and storage 406. The large format appliance 106 is communicatively coupled via a network 510 to the internet-accessible server machine 502 and to the on-premises server machine 504. Similarly, the reduced format appliance 108 is communicatively coupled via the network 510 to the internet-accessible server machine 502 and the on-premises server machine 504. In this scenario, the appliances 106 and 108 along with the servers 502 and 504 communicate with each other and share information to determine whether to store a particular asset on the internet-accessible server machine 502, on the on-premises server machine 504, or on another storage device.

As discussed above, this determination can be based on characteristics or properties of possible storage locations in the system. For example, the on-premises server machine 504 may be more secure than the internet-accessible server machine 502. This determination can also be based on the internet-accessible server machine 502 having more storage space than the on-premises server machine 504. For example, an asset may be stored on either the internet-accessible server machine 502 or the on-premises server machine 504 based on the security level of the asset. However, if the asset takes up more storage space than is available on the on-premises server machine 504, or will not leave enough storage space for the on-premises server machine 504 to perform other tasks, then the asset may be directed to the internet-accessible server machine 502.

Other factors may be used to determine which of the locations to store an asset. For instance, if connectivity across the network 510 from the appliances 106 and 108 to the internet-accessible server machine 502 is poor, assets having a lower security level may be temporarily stored on the secure on-premises server machine 504 before being transferred to the internet-accessible server machine 502 when conditions improve. On the other hand, if the on-premises server machine 504 does not have the resources to accommodate an asset for whatever reason, the internet-accessible server machine 502 can be used for permanent storage or temporary storage until the on-premises server machine 504 has sufficient resources to accommodate the asset. Because the appliances 106 and 108 and the servers 502 and 504 are in communication with each other regarding the shared workspace and the resources available to the servers, assets can be automatically and seamlessly moved as necessary without further input from participants in the workspace.

Figure 6:
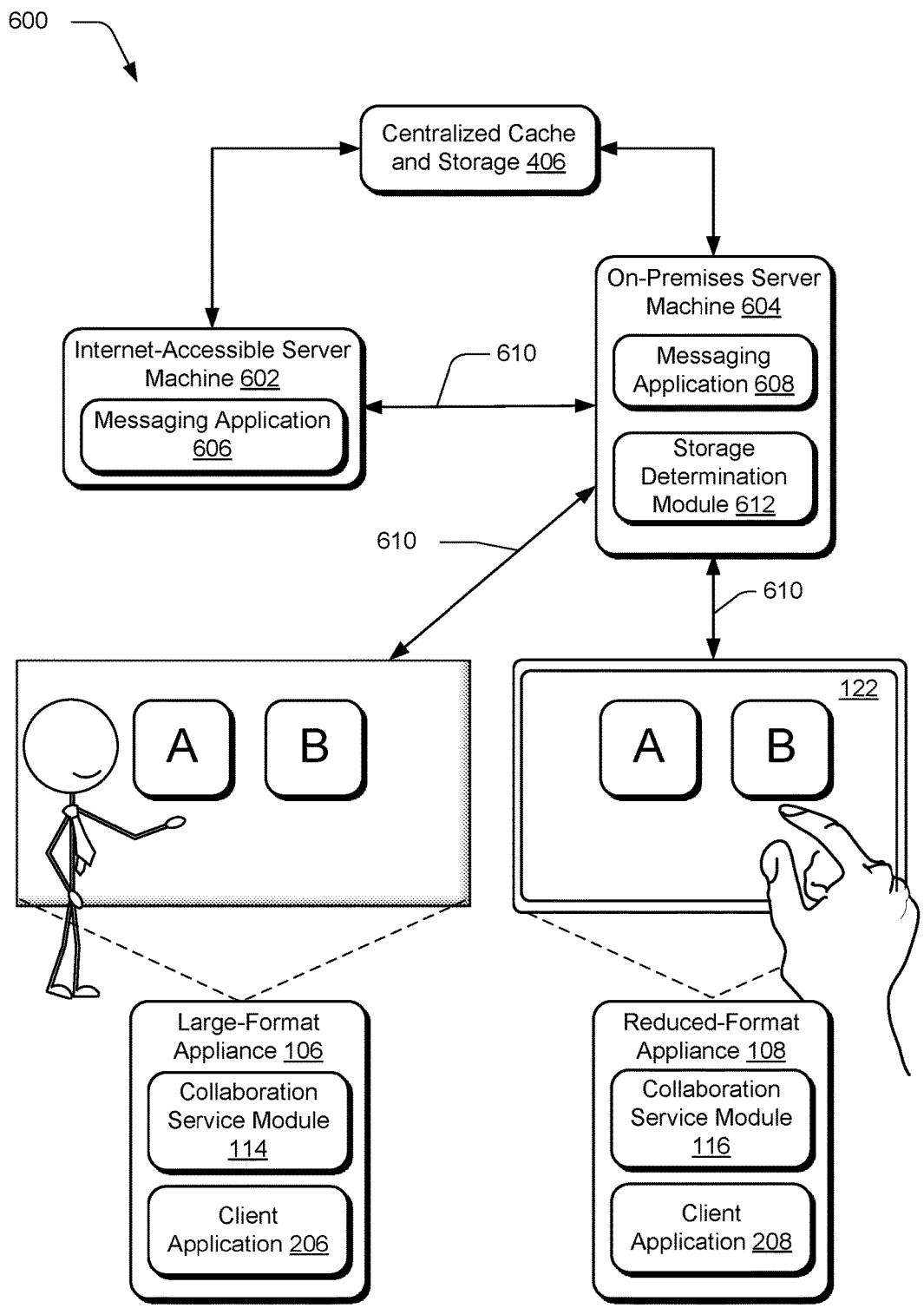
FIG. 6 illustrates additional details associated with a confidentiality-based file hosting system in accordance with one or more embodiments.

FIG. 6 illustrates a confidentiality-based file hosting system in accordance with one or more embodiments. Similar to the embodiment described with relation to FIG. 5, the system includes an internet-accessible server machine 602 and an on-premises server machine 604 coupled together via centralized cache and storage 406. However, the network 610 in this embodiment restricts the large format appliance 106 and the reduced format appliance 108 to communicate all data through the on-premises server machine 604.

The on-premises server machine 604 is also depicted as having a storage determination module 612, which is configured to determine an appropriate storage location for assets based on security information associated with the assets and based on security levels of possible storage locations. Because the network 610 channels all data through the on-premises server machine 604, the on-premises server machine 604 can make determinations on where to direct assets for storage via the storage determination module 612. The storage determination module 612 can make use of conditions, such as rules and/or thresholds, which can contribute to a decision on where to direct an asset. In some embodiments, condition logic can be stored on the on-premises server 604, providing centralized, secure access for users or administrators to manipulate when needed without having to change settings on multiple remote devices.

Alternatively or additionally, although not illustrated, the network 610 can instead restrict the large format appliance 106 and the reduced format appliance 108 to communicate data through the internet-accessible server machine 602. This may be useful, for instance, in systems having a large number of appliances that access shared workspaces with low frequency (e.g., single-time shared workspace participants). The administrators of the system may not want to grant access to a secure, on-premises server to these appliances, which may pose a security risk when creating and manipulating assets on the on-premises server.

In this scenario, the internet-accessible server machine 602 would include a storage determination module, as discussed above. The storage determination module on the internet-accessible server machine 602 can utilize condition logic stored at the internet-accessible server to determine appropriate storage locations to direct assets for storage. Additionally, to protect more confidential assets, the internet-accessible server machine 602 may be configured to receive metadata associated with an asset and which contains information regarding the asset's security level before actually receiving or accessing the asset. This enables the internet-accessible server machine 602 to make decisions regarding management of the asset before the asset is moved from its current location. Further, the internet-accessible server machine 602 can be configured to specify IP addresses for other locations where assets may be located without accessing the asset itself. For example, the internet-accessible server machine 602 may provide the large format appliance 106 with an IP address of an asset located on the on-premises server machine 604 such that the large format appliance 106 can view or download the asset directly from the on-premises server machine 604.

While the implementations described herein generally relate to an environment having an internet-accessible server (e.g., a "cloud" server) and a server that is within a network security system that controls incoming and outgoing network traffic based on a set of rules (e.g., an on-premises server), other embodiments are also contemplated. Another contemplated embodiment may comprise a network-based file share where an asset is hosted behind a firewall in a secure environment. In this case, the network may be IT-based or domain-name-based, and an internet-accessible server contains metadata corresponding to the asset. In this case, access to the asset would be directly from the file share location from an application on an appliance.

Another possible alternative environment may include one or more application services which are responsible for storing and hosting assets, and would also facilitate encryption of paths to the assets. The application services in this scenario are configured to communicate with an internet-accessible server and client-side appliances in order to coordinate delivery of assets to the appliances. The communication between a server within a network security system and the internet-accessible server may be through an encrypted path, such as a multiprotocol label switching (MPLS) service or a virtual private network (VPN) connection. In this case, the services provided by the server within the network security system are specialized to facilitate the hosting of secure file content, whereas the application logic and determinations are located on the internet-accessible server. Other embodiments of possible environments are also contemplated.

Having considered several systems which may implement confidentiality-based file hosting, consider now an example device which may be utilized within a confidentiality-based file hosting system.

Figure 7:
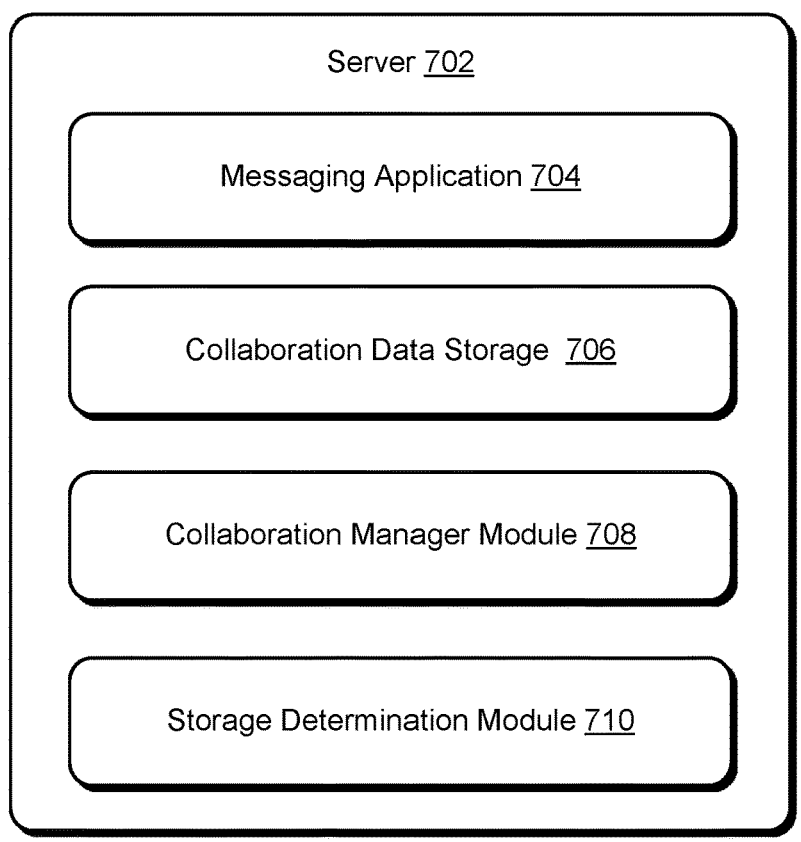
FIG. 7 depicts example details of a server configured to perform aspects related to confidentiality-based file hosting.

Turning now to FIG. 7, example details of a server 702 which is configured to perform aspects related to confidentiality-based file hosting are depicted generally at 700. The server 702 includes a messaging application 704, which can be configured to implement functionality described in relation to the messaging applications 408 and 410 of FIG. 4, to generate real-time socket connections with the large and reduced format appliances to allow messages to be transported quickly between the appliances. The server 702 also includes collaboration data storage 706, which may be configured to store assets, condition logic, or other data which may relate to a collaboration.

The server 702 further includes a collaboration manager module 708. In addition to the functionality provided by the collaboration manager module 112 of FIG. 1, the collaboration manager module 708 is further configured to receive metadata associated with assets that are to be shared in a shared workspace. This metadata can indicate a designated security level for each respective asset. The collaboration manager module 708 is also configured to make changes to security levels of assets as necessary, either by making automatic determinations based on circumstances associated with an asset or by receiving indications from a user that a security level of an asset is to be changed.

In addition, the server 702 includes a storage determination module 710. The storage determination module 710 is configured to identify a security level of an asset shared in the shared workspace, such as by using metadata associated with the asset. Based on the security level of the asset, the storage determination module 710 causes the asset to be directed to a storage location from a collection of storage locations. The collection of storage locations can have varying degrees of security for storing assets. Some examples of possible storage locations to store assets include internet accessible servers which might be outside a system firewall, on-premises servers, servers protected by a firewall, servers within a network security system that controls outgoing and incoming network traffic based on a set of rules, storage that is integrated into an appliance, removable storage, and so on. The storage determination module 710 compares the security level of the asset to a known security level for each possible storage location in the collection of locations. Then, the storage determination module 710 directs the asset to be stored at a location having a security level that is at least commensurate with or higher than the security level of the asset.

The server 702 is situated in the confidentiality-based file hosting environment such that it can make determinations on where to store assets and direct the assets to appropriate storage locations. In one example, the server 702 is an internet-accessible server configured to receive metadata associated with an asset before the asset is directed to a storage location. In this scenario, the internet-accessible server has knowledge of IP addresses of any on-premises servers. The server 702 can direct participants of a collaboration via collaboration module 708 to an on-premises server to access assets stored in that location, based on the received metadata associated with an asset. The storage determination module 710 may further utilize security rules to interpret metadata associated with asset security levels and select a storage location from a collection of possible storage locations. Other locations for server 702 within the confidentiality-based file hosting environment, and characteristics associated with the server 702, are also contemplated.

For example, the server 702 may receive an indication by way of the messaging application 704 that a collaboration is taking place. When an asset is presented in the collaboration as part of a shared workspace, metadata associated with the asset is received by the server 702. This metadata can give an explicit indication of a security level for the asset, or might alternatively give other information from which the storage determination module 710 can determine an appropriate security level for the asset. When a security level for the asset is ascertained, the storage determination module 710 directs the asset to an appropriate location to be stored. This may involve moving the asset to another storage location, or leaving the asset in the current storage location, depending on the circumstances of the collaboration and the subject matter of the asset.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 8:
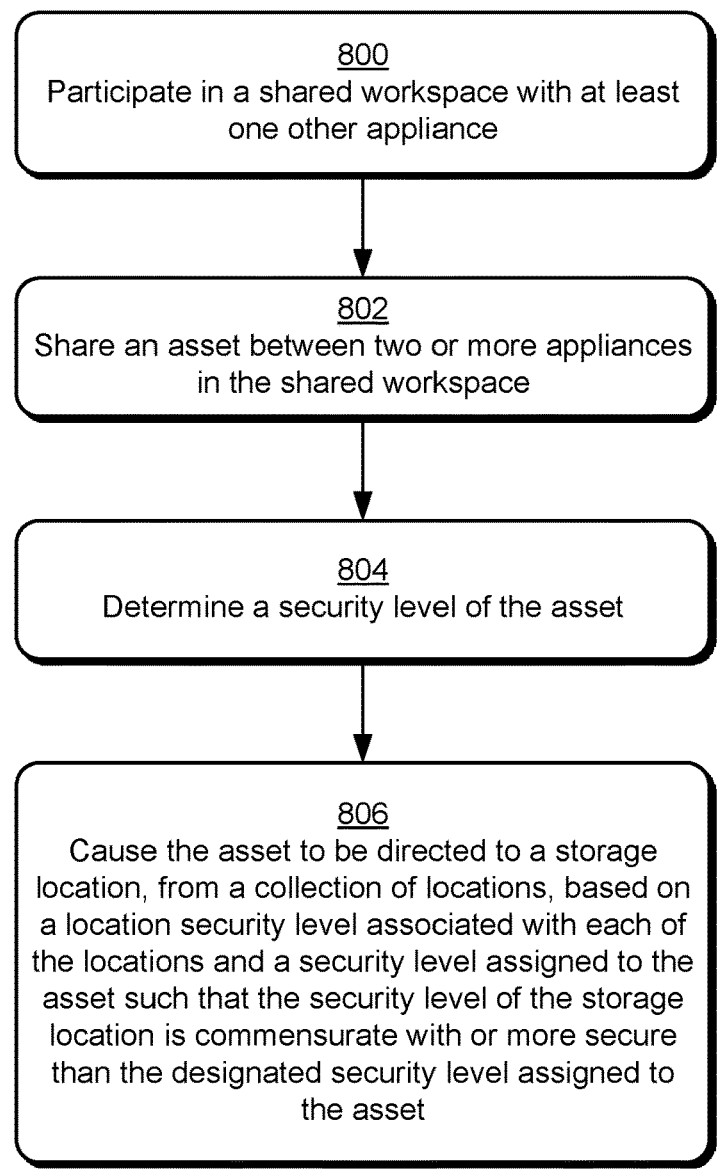
FIG. 8 depicts generally a flow diagram for an example procedure to perform confidentiality-based file hosting.

FIG. 8 depicts generally a flow diagram for an example procedure to perform confidentiality-based file hosting. The procedure depicted in FIG. 8 can be implemented by way of a suitably configured appliance or server, such as by way of the collaboration manager module 112 and/or the collaboration service modules 114 and 116. The procedure depicted in FIG. 8 can also be implemented by way of other functionality described in relation to the examples of FIGS. 1-7 and 10. Individual operations and details discussed in relation to FIG. 8 may also be combined in various ways with operations and details discussed herein in relation to the example procedure of FIG. 9.

An appliance participates in a content sharing session that utilizes a shared workspace with at least one other appliance (block 800). As discussed above, the shared workspace enables the appliances to create, present, and/or edit assets between the appliances. The shared workspace can be a shared workspace configured to share assets and enable user interactions with those assets. The shared workspace also allows appliances having various forms and capabilities to participate via a network, such as the large-format appliance 106 and the reduced-format appliance 108 over the network 110.

The appliance or appliances participating in the shared workspace may have respective designated security levels associated with each appliance. Alternatively or additionally, the users participating in the shared workspace who are operating the appliances may have designated security level clearances. These designated security levels can indicate a minimum or maximum level of security for assets that are created, edited, or presented on the appliances participating in the shared workspace. For example, when a collaboration is initiated, the collaboration manager module 112 can identify that one of the participating appliances is in a public location, and is viewable by members of the public. Therefore, this appliance would be associated with a low level of security, and an asset created in this shared workspace could be assigned a lower security level via the collaboration manager module 112.

In another example, participants of a collaboration may be asked to sign in before being granted access to the shared workspace. Each participant may have a security clearance associated with their respective profile. The collaboration manager module 112 can identify assets that can be presented in the shared workspace based on the security clearance of the participants in the shared workspace. In any case, an appropriate initial level of security is determined based on the participants and/or appliances taking part in the collaboration.

An asset is shared between two or more appliances in the shared workspace (block 802). As discussed above, sharing an asset can include creating an asset, accessing an existing asset, modifying or editing an asset, or presenting an asset, to name a few examples. Sharing the asset can cause the asset to be displayed within a dynamically adjustable presentation window configured for the particular appliances participating in the collaboration. In one or more implementations, the asset can be modified using a software application associated with the asset. For example, participants may be able to manipulate the asset according to the content type of the asset, the software application associated with the asset, functionality of the particular appliance that is accessing the shared workspace, or permissions of the participants of the shared workspace, to name some examples. When creating an asset or introducing an asset into a collaboration, participants can be prompted to designate an initial security level, such as a security level that complies with the appliances participating in the collaboration and the contents of assets in the shared workspace.

At block 804, a security level of the asset is determined. The security level of the asset may be a function of a source from which the asset is shared, such as a higher security level as a result of the asset being shared from a removable storage device, secure storage file location, or encrypted storage, to name some examples. Alternatively or additionally, the security level of the asset may be function of a property or characteristic of the asset. For example, if portions of the asset are encrypted, this can indicate a higher security level for the asset. Further, the security level of the asset may be a function of an environment from which the asset is shared, such as if the asset is shared from a location behind a firewall or within a VPN environment. The security level of the asset may be accessed from metadata associated with the asset, analysis of the asset's characteristics or properties, or may be explicitly designated in a format that can be utilized by storage determination module 710 as described above. Other ways of determining a security level of an asset are also contemplated.

Other characteristics of an asset may also be leveraged to determine an appropriate security level for the asset. For instance, a security level of the asset may be a function of a permission associated with the asset. Permissions associated with an asset can include read/write permissions or accessibility permissions associated with the asset. In one example, an asset that has a "read only" permission may be assigned a higher security level. In another example, an asset may grant accessibility to only a certain group of users who have a specific security clearance, and thus may be assigned a higher security level. Alternatively or additionally, a file directory from where the asset is accessed may be indicative of a security level of the asset. In this case, the system can determine a security level of the directory, such as by permissions associated with the directory, and subsequently determine an appropriate storage location for the asset if the asset is to be transferred to another storage location. Any sort of indication associated with the asset can be used to provide context as to the security level needed for storage of the asset.

Sharing the asset may result in changes to the initial security level associated with the asset. Changing the security level of the asset is addressed in greater detail with respect to the discussion of FIG. 9. It should be appreciated, however, that adding or removing content from the asset, and/or modifying the asset may cause the security level of the asset to be changed. Further, changing the security level of the asset may occur several times over the course of the shared workspace as the asset is presented or modified.

Responsive to determining the security level of the asset, the asset is directed to a storage location, from a collection of storage locations, based on a security level associated with each of the locations and the security level assigned to the asset. The storage location is chosen such that the security level of the storage location is commensurate with or more secure than the security level assigned to the asset (block 806). The collection of storage locations may comprise, for example, an on-premises server or servers and an internet-accessible server or servers, such as a "cloud" server. If it is determined that the asset requires a high level of security for storage, the asset can be directed to the more secure, on-premises server. On the other hand, if the asset does not require a high level of security, the asset can be directed to the internet-accessible server.

In one or more implementations, the internet-accessible server can be the default storage location for assets, as the internet-accessible server may have a much larger storage capacity than an on-premises server. In such an example, the storage location for the asset can be changed before, during, or after the collaboration if a more secure storage location is desired. Alternatively or additionally, an on-premises server can be the default storage location for assets, to ensure that the asset remains secure from start to finish of the collaboration. In this scenario, the storage location for the asset can be changed before, during, or after the collaboration if it is determined that the asset does not need the heightened security level of the on-premises server. This can free up resources on the on-premises server for other use.

While the implementations described herein provide an on-premises server and an internet-accessible server as possible storage locations, it should be appreciated that any type of storage location is considered. In an additional example, the asset may originate from a personal storage device, such as a removable hard drive or a flash drive. The asset may have a very high security level required for storage. When the system recognizes this asset's required high security level, the system can make a determination that the asset should remain stored on the removable hard drive or flash drive, and not be directed to an on-premises server or an internet-accessible server. Further, while the on-premises server is described in examples herein as a more secure storage location, this may not always be the case, as other locations (including an internet-accessible server) may be more secure. The determination of which storage locations are appropriate based on each storage location's level of security may be performed on a case-by-case basis for each collaboration and the assets in the respective shared workspace.

While the above examples generally provide techniques for automatically directing assets to appropriate storage locations, it should be realized that these determinations can be initiated or overridden by users. For example, when creating an asset or initiating a shared workspace, a user may be prompted by the system to provide an initial security level for the asset. Alternatively or additionally, the user may be prompted to choose an initial location to store the asset that is appropriate for the level of security of the asset. This initial storage location can provide a basis from which the system can later change the storage location as the asset changes. In another example, when an asset has already been created and data that is more confidential is added to the asset, a user can change either the security level of the asset or the storage location of the asset as appropriate. Other examples of directing assets to appropriate storage locations are also contemplated.

Figure 9:
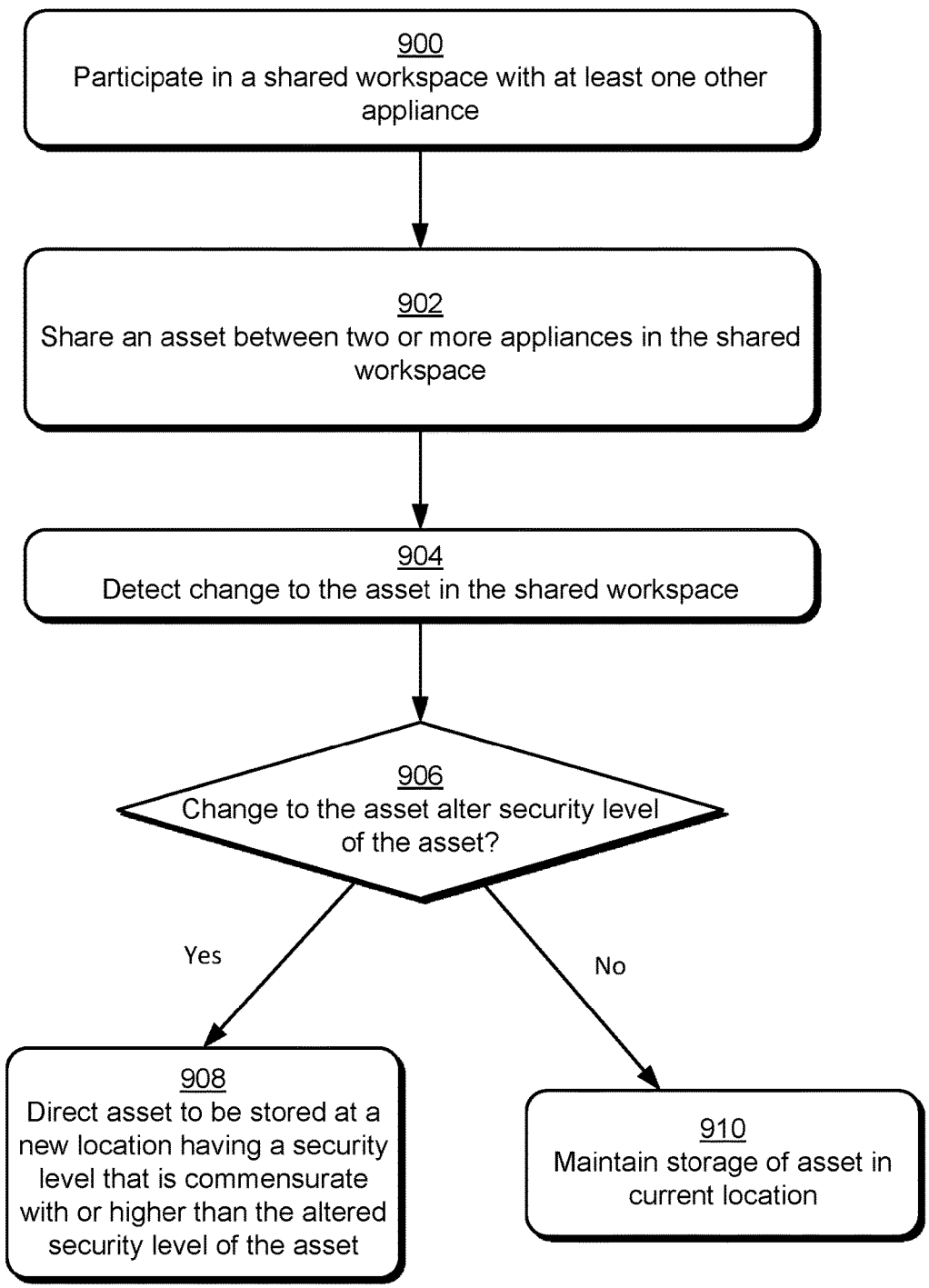
FIG. 9 depicts a procedure in an example implementation in which confidentiality-based file hosting may be performed.

FIG. 9 depicts a procedure in an example implementation in which confidentiality-based file hosting may be performed. The procedure depicted in FIG. 9 can be implemented by way of a suitably configured appliance or server, such as by way of the storage determination module 710, collaboration manager module 112 and/or the collaboration service modules 114 and 116. The procedure depicted in FIG. 9 can also be implemented by way of other functionality described in relation to the examples of FIGS. 1-7 and 10. Individual operations and details discussed in relation to FIG. 9 may also be combined in various ways with operations and details discussed herein in relation to the example procedure of FIG. 8.

At block 900, an appliance participates in a shared workspace with at least one other appliance. As discussed above, the shared workspace enables the appliances to create, present, and/or edit assets between the appliances. The shared workspace can be a shared workspace configured to share assets and enable user interactions with those assets. The shared workspace also allows appliances having various forms and capabilities to participate via a network.

An asset is shared between two or more appliances in the shared workspace. The asset is initially stored in a storage location that having a security level that is commensurate with or higher than a security level associated with the asset (block 902). As discussed above, sharing an asset can be achieved by creating an asset, accessing an existing asset, modifying or editing an asset, or presenting an asset, to name a few examples. Sharing the asset can comprise displaying the asset within a dynamically adjustable presentation window configured for the particular appliances participating in the shared workspace. In one or more implementations, the asset is a dynamic element that enables interaction with the software application associated with the asset.

The asset is shared between appliances having participants that meet the security requirements associated with the asset. This can be achieved by requiring participants to authenticate themselves. For example, participants may be asked to enter a username and password to enter the shared workspace, and the shared workspace may only present assets that comply with security levels in user profiles of the participants in the shared workspace. Alternatively or additionally, other authentication techniques may be used, such as voice, fingerprint, iris, or facial recognition, to name a few examples. These authentication techniques can be linked to a participant's security clearance level, giving an indication to the system of which assets can be presented or accessed during the shared workspace.

Next, a change to the asset in the shared workspace is detected (block 904). This may comprise editing the asset, adding information to the asset, removing information from the asset, combining assets, dividing assets, saving the asset to a new or different location, changing the read/write permissions of the asset, or manually changing the security level of the asset, to name some examples.

A determination is made as to whether the change to the asset alters the security level of the asset (block 906). In one example, adding information to the asset may increase the asset's security level. This may be determined by metadata associated with the new information, a storage location from which the new information originated, keywords that trigger a flag for a higher security level, and so on. In another example, information that was originally part of an asset causing the asset to require a high security level may be removed, which lowers the security level of the asset as a whole. In still another example, two (or more) assets may be combined, which may result in either a higher or a lower overall security level for the combined assets. If the security level of the asset is changed as a result of the change to the asset, the asset is directed to be stored at a new location having a security level that is commensurate with or higher than the altered security level of the asset (block 908). However, if these changes do not cause the security level of the asset to be changed, the storage of the asset is maintained in the current location that satisfies the security level of the asset (block 910).

Having considered an example method in accordance with one or more embodiments, consider now an example system and device that can be utilized to implement the principles described above.

Example System and Device

FIG. 10 illustrates an example system generally at 1000 that includes an example computing device 1002 that is representative of one or more computing systems and/or devices that may implement the various techniques described herein. This is illustrated through inclusion of the collaboration service module 114 and collaboration manager module 112. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Various embodiments provide confidentiality-based file hosting by automatic and dynamic direction of assets to an appropriate storage location. The direction is based on security levels associated with the assets and security levels associated with various possible storage locations. Techniques described herein provide direction of assets having a designated security level to a storage location having a location security level that is commensurate with, or more secure than, the security level associated with the asset. In one or more implementations, selection of a storage location can be between an on-premises server and a cloud server. Because on-premises servers can be more secure than cloud servers, this can be a deciding factor in which location to store the asset. Additionally, if a security level of the asset is changed in the shared workspace, the asset is automatically directed to an appropriate storage location based on the changed security level. This can include directing the asset to either a more secure or a less secure storage location, such as between a more secure on-premises server, or a less secure cloud server. Further, because the level of security of the storage locations is known, no further input is needed from the participants in the shared workspace regarding where to direct the asset. The asset is automatically directed to a storage location having an appropriate level of security, so that participants can focus on the substance of the shared workspace rather than worrying about adequate storage of assets.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   participating, by an appliance, in a shared workspace with one or more other appliances, said participating taking place via one or more networks that enable said appliance and said one or more other appliances to share assets, wherein a first asset of the shared assets has a lower security level indicated in metadata associated with the first asset, and wherein a second asset of the shared assets has a higher security level indicated in metadata associated with the second asset;
   causing the first asset to be directed to a first storage location, from a collection of locations, based upon a location security level associated with each location of the collection of locations, the first location at which the first asset is stored having a location security level that is at least commensurate with or more secure than the indicated security level the first asset, wherein the first location at which the first asset is stored is remote from said appliance;
   causing the second asset to be directed to a second storage location, from the collection of locations, based upon the location security level associated with each location of the collection of locations, the second location at which the second asset is stored having a location security level that is at least commensurate with or more secure than the indicated security level of the second asset, wherein the second location at which the second asset is stored is within a network security system that controls incoming and outgoing network traffic based on a set of rules, and wherein said appliance is within the network security system;
   detecting a change to the first asset in the shared workspace; and
   responsive to the change to the first asset increasing the indicated security level of the first asset, dynamically directing the first asset to be stored at a new location that is commensurate with or more secure than the altered indicated security level of the respective asset, the new location being within the network security system, otherwise maintaining storage of the respective asset in the current location.

2. A method as described in claim 1, further comprising displaying a prompt that requests a designated security level for an asset in association with the asset being shared in the shared workspace.

3. A method as described in claim 1, wherein said remote location is Internet-accessible.

4. A method as described in claim 1, wherein said remote location comprises an internet-accessible server.

5. A method as described in claim 1, wherein at least one indicated security level of an asset is a function of a source from which said asset is shared.

6. A method as described in claim 1, wherein at least one indicated security level of an asset is a function of a property or characteristic of said asset.

7. A method as described in claim 1, wherein said at least one indicated security level of an asset is a function of a permission associated with said asset.

8. A method as described in claim 1, further comprising, responsive to an asset being shared in the shared workspace, displaying a prompt to enable a user to assign a different designated security level to the shared asset relative to a currently-designated security level of the shared asset.

9. A method as described in claim 1, wherein said causing the first asset to be directed to the first storage location or causing the second asset to be directed to the second storage location is performed based, at least in part, on a connection type between said appliance and location at which the respective first asset or second asset is stored.

10. A method as described in claim 1, wherein at least one location comprises a network file share.

11. A method as described in claim 1, wherein said causing the first asset to be directed to the first storage location or causing the second asset to be directed to the second storage location is performed responsive to receiving a communication from a remote server specifying the location at which the respective first asset or second asset is to be stored.

12. A collaboration server configured to enable collaboration between multiple appliances within a shared workspace, the collaboration server comprising:
   a collaboration manager module, implemented at least partially in hardware, and configured to receive metadata associated with one or more assets that are to be shared within the shared workspace, individual assets having a designated security level; and
   a storage determination module, implemented at least partially in hardware, and configured to:
      identify a security level for an asset that is to be shared and, based on the security level for the asset that is to be shared, cause the asset that is to be shared to be directed to a storage location, from a collection of locations, based upon a location security level associated with each location of the collection of locations, the location at which the asset that is to be shared is stored having a location security level that is at least commensurate with or more secure than the designated security level of the asset that is to be shared, wherein at least one location of said collection of locations is a security server that is within a network security system that controls incoming and outgoing network traffic based on a set of rules; and wherein at least one location of said collection of locations is an Internet-accessible server;

detect a change to the asset that is to be shared; and responsive to the change to the asset that is to be shared increasing the security level of the asset that is to be shared, dynamically directing the asset that is to be shared to be stored at a new location that is commensurate with or more secure than the security level of the asset, the new location being within the security server that is within the network security system, otherwise maintaining storage of the asset that is to be shared in the current location.

13. A collaboration server as described in claim 12, wherein the collaboration manager module and the secure storage determination module reside on the security server.

14. A collaboration server as described in claim 12, wherein the storage determination module is configured to reevaluate locations at which assets are stored, responsive to modification of a respective asset that changes the respective asset's designated security level.

15. A collaboration server as described in claim 12, wherein the storage determination module is configured to reevaluate locations at which assets are stored, responsive to modification of a respective asset's designated security level.

16. A collaboration server as described in claim 12, wherein the server that is not publicly accessible is located within the network security system.

17. A collaboration server as described in claim 12, wherein the storage determination module is further configured to consider asset allocation on the server that is not publicly accessible, when selecting a storage location for a particular asset.

18. A collaboration server as described in claim 12, wherein the collaboration server is within the network security system.

19. A system comprising:

one or more processors;

a collaboration server configured to enable a collaboration between multiple appliances within a shared workspace; and one or more computer-readable storage devices comprising instructions stored thereon which, responsive to execution by the one or more processors, cause the collaboration server to perform operations comprising:

facilitating the collaboration between the multiple appliances;

sharing an asset between two or more of the multiple appliances in the shared workspace, the asset being stored in an initial storage location that is commensurate with or higher than a security level associated with the asset;

detecting a change to the asset in the shared workspace; and responsive to the change to the asset increasing the security level of the asset, dynamically directing the asset to be stored at a new location that is commensurate with or more secure than the security level of the asset, the new location being within a network security system that controls incoming and outgoing network traffic based on a set of rules, otherwise maintaining storage of the asset in the current location.

20. A system as recited in claim 19, wherein the change to the asset comprises one or more of adding content to the asset, deleting content from the asset, combining the asset with another asset, or dividing the asset into two or more new assets.

\* \* \* \* \*